United States Patent [19]

Scherber et al.

[11] Patent Number: 4,708,419

[45] Date of Patent: Nov. 24, 1987

[54] PROTECTION OF IR SENSITIVE EQUIPMENT

[75] Inventors: Werner Scherber, Bermatingen; Hans W. Schroeder, Immenstaad, both of Fed. Rep. of Germany

[73] Assignee: Dornier System GmbH, Friedrichshafen, Fed. Rep. of Germany

[21] Appl. No.: 649,817

[22] Filed: Sep. 12, 1984

[30] Foreign Application Priority Data

Sep. 14, 1983 [DE] Fed. Rep. of Germany ....... 3333165
Mar. 22, 1984 [DE] Fed. Rep. of Germany ....... 3410502
Apr. 28, 1984 [DE] Fed. Rep. of Germany ....... 3415974

[51] Int. Cl.$^4$ ................................................. G02B 5/00
[52] U.S. Cl. ..................................... 350/1.1; 350/319; 350/320
[58] Field of Search ................. 350/1.1, 1.6, 316, 582, 350/589, 560, 320, 319

[56] References Cited

U.S. PATENT DOCUMENTS

| 3,471,212 | 10/1969 | Sloane | 350/316 |
| 3,766,080 | 10/1973 | Swinehart et al. | 350/1.1 |
| 3,981,818 | 9/1976 | Swinehart et al. | 350/1.1 |

OTHER PUBLICATIONS

Evans et al., Chemical Abstract 97:7831h, "The Influence of Cooling Rate on the Adhesion of Polyethylene Coatings Applied to Metals as a Hot Melt", 1981.

The I-R Handbook, Edited by Wolf, W. L., The IR Information and Analysis Center, Environmental Research Institute of Michigan, pp. 24–55 and 7–44, 1978.

Primary Examiner—Bruce Y. Arnold
Attorney, Agent, or Firm—Ralf H. Siegemund

[57] ABSTRACT

Certain thermoplastics, notably high molecular weight, oriented amorphous or partially crystalline polyethylene are used as a cover for or directly as a window for IR equipment in aircraft, permitting direct exposure to the environment.

6 Claims, No Drawings

PROTECTION OF IR SENSITIVE EQUIPMENT

BACKGROUND OF THE INVENTION

The present invention relates to a protective cover for a window or a window insert which is IR transparent for use in conjunction with infrared devices and particularly for utilization in equipment which will respond to IR bands within the so-called third atmospheric window extending from 8 to 13.5 micrometer, the cover or window itself is to serve as protection against rain-induced erosion or other moisture. The invention will particularly refer to covers in apparatus and devices to be used in aircraft or ships, whereby the latter are particularly in need of protection against moisture and salt water spray in general.

Infrared sensors are quite useful and have significant importance in the area of military reconnaissance, target acquisition, etc. under utilization of infrared radiation. Herein the so-called third atmospheric "window" in the large wave infrared range from 8 to 13.5 micrometer has gained increasing importance because in this particular range of wave length, objects having generally a temperature which does not differ significantly from the environmental temperature can in fact be made "visible" through the thermal radiation emission, having a significant component within this particular band and "window".

Infrared systems arranged to look ahead, i.e., in forward direction, and being mounted in aircraft or the like, or infrared systems in ships such as infrared periscopes in submarine vehicles or night-sight equipment of regular vessels, all have to be protected against the environment in one form or another. The protection specifically has to work against rain and erosion due to rain or against sea water. Usually this protection is provided through a suitable cover producing IR windows, and sometimes being configured as an IR dome. Here, however, it has to be considered that most solid objects are opaque with respect to radiation in the range of interests from 8 to 13.5 micrometer, so that only very few materials are suitable at all from the point of view of infrared transmission. This of course does not mean that any such material is also suitable for a protective purpose as far as rain and other moisture is concerned.

Considering the matter in some detail it is, for example, well known that germanium zinc-sulphide, gallium arsenide and zinc selenide are indeed transparent to this long wave infrared radiation. However, none of these materials can be regarded as erosion proof when exposed to rain. Thus, any all-weather utilization is practically excluded as far as these materials are concerned. This is particularly noticeable with regard to zinc selenide, which material is well known for its very low transmission and absorption losses in the long range of IR wave, particularly for waves in the range from 8 to 13.5 micrometer. Zinc selenide will exhibit a 50% IR transmission loss at a speed of the equipment of about 0.68 mach and a rain intensity of 25 millimeter per hour within about 10 seconds.

Polyurethane covers are used, for example, for protecting glass fiber reinforced synthetics, because such a material is considerably more resistant against rain erosion. However, polyurethane is not transparent for infrared and is, therefore, unsuitable for the intended task right from the beginning. Silicon on the other hand is also a well proven infrared window material in the middle infrared range, and the period of time in which transmission will be reduced to about 50% is about a thousand times longer than in the case of zinc selenide (i.e., about 3 hours). However, silicon is not a suitable window material from the point of view of transmission in the long infrared range. Thus, again this material is not suitable for the intended task.

As far as is known, materials which are in fact known to have infrared transmission in the long wave range simply exhibit consistently very poor resistance against rain erosion, and are therefore not suitable, for example, in aircraft. Even relatively slow flying aircraft still expose such material to the rain erosion to such an extent that loss in transmission occurs rapidly.

DESCRIPTION OF THE INVENTION

It is an object of the present invention to provide a new and improved coating or window material for infrared equipment operating particularly in the long wave infrared range, and which is still sufficiently resistant against rain erosion or other moisture such as ocean water.

In accordance with the preferred embodiment of the present invention, it is suggested to provide such a coating or window from a thermoplastic synthetic, including particularly polyethylene, polyetheretherketone, polysulfone, polyphenylenoxide, perfluoralkoxy copolymer, polyethersulfone, polyacetal, polyamid, polypropylene or a fluoro containing thermoplastic material. Of particular interest is ultra high molecular polyethylene. The cover or the window are preferably made of amorphous or partially crystalline material with crystallites smaller than the infrared wave length of interest (8 micrometers). The thermoplastic material of the window should have very high strength which results from molecular orientation such as solidification carried out under particular conditions of orienting the molecules. In case of a cover, a hot melting adhesive is to be used for applying the coating, and affixing it to the equipment of interest. In the case of a window proper, it should be forced upon the infrared equipment, and any gap is to be filled with a material which matches both indices of refraction.

Considering the invention now in some detail, it should be pointed out that thermoplastic material is a kind of material which is not used as an outer skin of fast flying aircraft. It was found, however, that particularly the thermoplastic materials mentioned above are sufficiently resistant against rain erosion, and are therefore suitable for fast flying aircraft. The invention therefore proposes for the first time the utilization of a window or cover in infrared radiation detection system which provides adequate resistance against weather conditions, and particularly permits installation with a forward looking line of sight. Moreover, polyethylene is indeed transparent for long wave infrared radiation, particularly radiation in the above mentioned third atmospheric window from 8 to 13.5 micrometer.

The materials in accordance with the invention protect mechanically the sensitive infrared components of the equipment, and protects the equipment particularly against chemical aggression by, for example, ocean water. The materials moreover protect the infrared equipment against moisture of any kind. The smooth surface of thermoplastic material does not require any specific surface finishing such as polishing or grinding. The resistance against rain erosion of infrared components, particularly of IR windows or IR domes, and to be used as stated, is particularly increased if one uses polyethylene as a cover.

It was found generally that the materials outlined above have indeed a very good resistance against rain erosion. Polyethylene yielded the best results, particularly if polyethylene of ultra high molecular configuration was used. By way of example, the molecular weight should be in excess of one million. Polyethylene moreover has the desired low transmission and reflection losses, particularly in the infrared range of interest. Partially crystalline material is deemed transparent only in the visible portion of the spectrum. It was found, however, that in view of the small size of the crystallites a certain transparency can be observed with increasing wave length in the far, i.e., long wave length range of infrared. The degree of crystallization and the texture, for example, globular super structures, can be controlled in a manner known per se through the molecular configuration such as molar weight and linearity. Heat treatment of the material can also be used for control.

Coatings and materials envisioned for practicing the invention should be, as was outlined briefly above, firmly connected with the particular infrared sensing equipment. Connection can be provided through melt adhesion, using polyethylene itself as adhesive. Alternatively, an attachment without bonding is also feasible in that, for example, a thermoplastic cover is just forced on top or over the infrared components of interest. Any gaps between the thermoplastic cover and the infrared equipment should be filled with material which matches the index of refraction, for example, wax. Some of the materials, for example, polyethylene provides in addition protection of any anti-reflection layer of any optical component, and the protection is provided not only against rain erosion, but against other moisture as well. This then permits the utilization even of hygroscopic materials for the anti-reflex coating.

The cover may have any thickness that is desired. Generally speaking, the covers and coatings have to be at least as thick that the direct, i.e., physical destruction of sensitive IR components and materials underneath will be avoided with certainty, at least at a high degree of reliability.

In cases, it is possible to cover infrared components such as windows and domes not only with a thermoplastic material, but to make the potentially exposed parts entirely from thermoplastic material. However, it has to be observed that the commonly used thermoplastics have comparatively low strength so that this particular instance is limited to special cases of overall low mechanical load or to relatively small areas.

The utilization of high strength material, particularly molecularly oriented thermoplastic material is of significant advantage. Oriented solidification permits making infrared windows and related components entirely from thermoplastic material. Herein one has to consider the anisotropic feature of relevant properties such as twin reflection, strength, rain erosion, etc.

Another advantage of the invention is to be seen in the well known fact that thermoplastic material usually conducts heat very poorly. The temperature or thermal conductivity is accordingly quite low. This is an important feature here because usually infrared windows, and particularly infrared equipment, may be interfered with through heating which, for example, can occur during flight by means of aerodynamic friction. Such heating, when effective, will produce loss in IR transmission. For example, germanium when heated to temperatures above 60 degrees centigrade loses its transparency for infrared radiation. Since the heat conductivity as well as the thermal conductivity of the cover material suggested in accordance with this invention is considerably smaller than the corresponding conductivity values of IR window material generally, one obtains accordingly a significant protection against undue heating of the material underneath the coating. By way of example, temperature (thermal) conductivity of polyethylene is about 0.165 multiplied by 10 with an exponent of minus 6, square meter per second and the heat conductivity amounts to 0.35 watts per kilometer. By comparison, however, the temperature conductivity of germanium is 3.55 times 10 with an exponent of minus 6, square meter per second, and is therefore higher by a factor of 21 as compared with polyethylene. Analogously, the heat conductivity of germanium is 5.86 watts per kilometer, which is 17 times larger than the corresponding value for polyethylene.

In the case of short term loading as is typical for some missiles, the synthetic cover protects the equipment underneath against such thermal peak load in a very effective manner.

The invention is not limited to the embodiments described above, but all changes and modifications thereof not constituting departures from the spirit and scope of the invention are intended to be included.

What is claimed is:

1. The method of protecting infrared equipment in aircraft against rain erosion, the equipment being sensitive to radiation in the range from 8 to 13.5 micrometer wavelength, comprising the step of using a cover or window transmissive to radiation in said wavelength range and consisting of a thermoplastic synthetic selected from the group consisting of polyetheretherketone, perfluoroalkoxy copolymer, polyethersulfone, polyacetal, polyamide.

2. The method as in claim 1, comprising the step of using a thermoplastic material being amorphous or partially crystalline with crystallites smaller than said wave length range.

3. The method as in claim 1, comprising the step of using a thermoplastic synthetic having ultra high strength due to oriented solidification of its molecules.

4. The method as in claim 1, including the additional step of applying said synthetic material through a melt adhesion process so that the synthetic material will adhere to said equipment.

5. The method of protecting infrared equipment in aircraft against rain erosion, the equipment being sensitive to radiation in the range from 8 to 13.5 micrometer wavelength, comprising the step of using a cover or window transmissive to radiation in said wavelength range and consisting of a fluoro containing thermoplastic material.

6. The method of protecting infrared equipment in aircraft against rain erosion, the equipment being sensitive to radiation in the range from 8 to 13.5 micrometer wavelength, comprising the step of using a cover or window transmissive to radiation in said wavelength range and consisting of an ultrahigh molecular weight polyethylene having a molecular weight in excess of one million.

* * * * *